US009836892B1

(12) United States Patent
Nishiyama et al.

(10) Patent No.: US 9,836,892 B1
(45) Date of Patent: Dec. 5, 2017

(54) VEHICULAR CONTROL DEVICE

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/619,669

(22) Filed: Jun. 12, 2017

(30) Foreign Application Priority Data

Aug. 2, 2016 (JP) .................................. 2016-152137

(51) Int. Cl.
| G07C 1/32 | (2006.01) |
| G07C 9/00 | (2006.01) |
| E05B 81/04 | (2014.01) |
| B60R 25/01 | (2013.01) |

(52) U.S. Cl.
CPC ................ G07C 1/32 (2013.01); B60R 25/01 (2013.01); E05B 81/04 (2013.01); G07C 9/00309 (2013.01); G07C 9/00658 (2013.01)

(58) Field of Classification Search
CPC .............................. G07C 1/32; G07C 2209/08
See application file for complete search history.

(56) References Cited

U.S. PATENT DOCUMENTS

| 7,778,743 | B2 * | 8/2010 | Arie ...................... B60R 25/246 307/10.7 |
| 8,725,315 | B2 * | 5/2014 | Talty ....................... B60R 25/24 340/426.13 |
| 2013/0318596 | A1 * | 11/2013 | Huang .................... G06F 21/46 726/18 |
| 2016/0113047 | A1 * | 4/2016 | Chen ..................... H04W 12/06 370/329 |

FOREIGN PATENT DOCUMENTS

| JP | H11-143834 A | 5/1999 |
| JP | 2012-036582 A | 2/2012 |

* cited by examiner

Primary Examiner — Carlos E Garcia
(74) Attorney, Agent, or Firm — Oliff PLC

(57) ABSTRACT

A vehicular control device includes: a transmitter section that transmits a request signal to an electronic key according to an input operation; a receiver section that receives a response signal from the electronic key; a verification section that performs verification of the electronic key on the basis of the response signal; a determination section that determines that an abnormal state occurs, when the receiver section cannot receive the response signal until a first time or when the receiver section receives the response signal until the first time and the verification section fails in verification based on the response signal, after the transmitter section has transmitted the request signal; and a control section that prohibits, when the determination section determines that an abnormal state occurs, a vehicle operation until a second time passes after the determination, and allows the vehicle operation after the second time has passed.

2 Claims, 4 Drawing Sheets

FIG. 2A

| THE NUMBER OF TIMES ABNORMALITY IN COMMUNICATION IS DETERMINED | TIME UNTIL WHICH VEHICLE OPERATION IS DISABLED (SECOND TIME) |
|---|---|
| ONE | 5sec |
| TWO | 30sec |
| THREE | 60sec |
| FOUR | 300sec |
| FIVE | 600sec |
| ⋮ | ⋮ |

FIG. 2B

| THE NUMBER OF TIMES ABNORMALITY IN COMMUNICATION IS DETERMINED | TIME UNTIL WHICH VEHICLE OPERATION IS DISABLED (SECOND TIME) |
|---|---|
| ONE TO THREE | 5sec |
| FOUR TO SIX | 30sec |
| ⋮ | ⋮ |

VEHICULAR CONTROL DEVICE

BACKGROUND OF THE INVENTION

Field of the Invention

The present invention relates to vehicular control devices that are mounted to vehicles, and control vehicle operation by performing verification through wireless communication with electronic keys.

Description of the Background Art

As one of systems mounted to a vehicle, an electronic key system (also referred to as a wireless key system, a keyless entry system, a smart entry system, or the like) that performs verification through wireless communication between an electronic key which can be carried by a user, and an in-vehicle device mounted in a vehicle, and that controls the vehicle on the basis of the verification result, is known.

In the electronic key system, the in-vehicle device transmits a request signal to the electronic key. When the electronic key receives the request signal from the in-vehicle device, the electronic key returns, to the in-vehicle device, a response signal that includes identification information unique to the key. When the in-vehicle device receives the response signal from the electronic key, the in-vehicle device performs verification by comparing the identification information included in the response signal with identification information which is previously registered in the in-vehicle device. When the verification has succeeded, the electronic key that has returned the response signal is verified as an authorized electronic key.

As one of tricks of unauthorized access for stealing a vehicle having an electronic key system mounted therein, for example, a trick for stealing a vehicle by relaying a signal (radio wave), is known. In the trick in which a signal is relayed, a request signal transmitted from an in-vehicle device is relayed and transmitted to a distant place by using a repeater of a suspicious person, so that the request signal reaches an electronic key outside the detection area of the in-vehicle device. If the electronic key transmits a response signal in response to the request signal, the response signal is relayed by using the repeater and transmitted so as to reach the in-vehicle device. Thus, even if the electronic key is not in the detection area of the in-vehicle device, verification of the electronic key succeeds. Therefore, the suspicious person can unlock a vehicle door, or can perform start-up of an engine. Accordingly, the vehicle may be stolen by this trick.

A technique for addressing the above-described trick of unauthorized access is disclosed in, for example, Japanese Laid-Open Patent Publication No. 2012-036582 (hereinafter, referred to as Patent Literature 1). In this technique, in a case where it is determined that transmission of a request signal which does not lead to successful verification is performed a predetermined number of times or more times, it is estimated that unauthorized access is performed. Thus, input operation onto a vehicle is disabled, to prohibit vehicle operation according to the input operation. Such a measure is based on the estimation that, in the above-described trick using relaying of a signal, an input operation onto the same vehicle may be repeated several tens of times or more times in order to find an electronic key of which the location is unknown.

However, in the technique disclosed in Patent Literature 1, a user or the like needs to perform a predetermined process (for example, rotates a key cylinder by a mechanical key for unlocking) in order to cancel disabling of an input operation onto a vehicle, that is, cancel prohibiting of vehicle operation according to the input operation. Thus, a problem arises that a process for cancelling prohibiting of vehicle operation according to the input operation is bothersome to a user.

SUMMARY OF THE INVENTION

The present invention has been made in view of the aforementioned problem, and an object of the present invention is to provide a vehicular control device that is capable of preventing, by prohibiting vehicle operation according to an input operation, the vehicle from being stolen, and that further allows a bothersome process for cancelling prohibition of the vehicle operation to be avoided.

In order to solve the aforementioned problem, a vehicular control device according to a first aspect of the present invention is directed to a vehicular control device that is mounted to a vehicle, and that controls a vehicle operation according to an input operation from a user, on the basis of a result of verification of an electronic key through wireless communication. The vehicular control device includes: a transmitter section configured to transmit a request signal to the electronic key when a predetermined detection section detects the input operation; a receiver section configured to receive, from the electronic key, a response signal in response to the request signal; a verification section configured to perform verification of the electronic key on the basis of the response signal; a determination section configured to determine that an abnormal state occurs, when the receiver section cannot receive the response signal until a first time or when the receiver section receives the response signal until the first time and the verification section fails in verification based on the received response signal, after the transmitter section has transmitted the request signal; and a control section configured to control a vehicle operation on the basis of a result of determination by the determination section. When the determination section determines that an abnormal state occurs, the control section prohibits a vehicle operation according to the input operation detected by the detection section, until a second time passes after the determination section has determined that the abnormal state occurs, and, after the second time has passed, the control section allows a vehicle operation according to the input operation that is newly detected by the detection section.

According to the first aspect, in a case where communication with the electronic key is determined as being abnormal since a response signal cannot be received, until the first time, in response to a request signal transmitted according to an input operation onto the vehicle being detected, or since, although the response signal can be received until the first time, verification of the electronic key has failed, the vehicle operation according to the input operation is prohibited (new input operation is not received) until the second time passes since the point of time of the determination. Thus, in a case where, for example, unauthorized access to the vehicle is performed, and abnormality in communication occurs, a time at which the following unauthorized access can be performed can be delayed. Therefore, the vehicle is less likely to be stolen.

Further, according to the first aspect, a time period for which vehicle operation according to an input operation is prohibited on the basis of the determination being "abnormal" is until passing of the second time. Thus, for example, even if a normal operation on the vehicle by a user is accidentally determined, due to noise or the like, as abnormality in communication, when the second time has passed, the prohibition of the vehicle operation is cancelled, and the vehicle operation is automatically allowed (restored to the previous state). Therefore, user's bothersome process for cancelling prohibition of vehicle operation can be avoided.

Moreover, according to the first aspect, in order to determine whether or not an "abnormal" state has occurred, not only whether or not a response signal can be received until the first time, but also whether verification of the electronic key based on the response signal received until the first time has succeeded or failed, are determined. Thus, even if, for example, a suspicious person who has firstly used relaying of a signal for the unauthorized access gives up the use of relaying of a signal and changes the use of relaying of a signal to hacking which is directly performed on the vehicle device, an abnormal state that has occurred in communication with the electronic key can be determined. Therefore, the vehicle is less likely to be stolen.

Further, according to a second aspect of the present invention, in the first aspect, the control section counts the number of times the determination section determines that an abnormal state occurs, and sets the second time such that the greater a counted value of the number of times is, the more greatly the second time is delayed.

According to the second aspect, in a case where "abnormal" is continuously determined, the number of times "abnormal" is determined is counted. Control is performed such that the greater the number of times "abnormal" is continuously determined is, the more greatly the second time is delayed. Therefore, for example, for unauthorized access in which abnormality in communication is repeated, a time at which the unauthorized access succeeds can be delayed. In particular, for unauthorized access in which abnormality in communication is repeated multiple times, as the number of times failure continuously occurs becomes greater, a time at which the unauthorized access succeeds can be further delayed. Thus, an effect of causing a suspicious person to give up the unauthorized access can be expected, and the vehicle may be effectively inhibited from being stolen.

As described above, in the vehicular control device according to the present invention, a vehicle is prevented from being stolen, by prohibiting a vehicle operation according to an input operation, and, further, a bothersome process for cancelling the prohibition of the vehicle operation can be avoided.

These and other objects, features, aspects, and advantages of the present invention will become more apparent from the following detailed description of the present invention when taken in conjunction with the accompanying drawings.

BRIEF DESCRIPTION OF THE DRAWINGS

FIG. 2A illustrates an exemplary case where a second time until which vehicle operation is prohibited, is determined by using a reference table;

FIG. 2B illustrates another exemplary case where a second time until which vehicle operation is prohibited, is determined by using a reference table;

DESCRIPTION OF THE PREFERRED EMBODIMENTS

[Outline]

In a case where a response to a request signal that is transmitted according to an input operation onto a vehicle having been detected, is determined as a malfunction, a vehicular control device of the present invention prohibits vehicle operation according to the input operation until a predetermined time passes since the point of time of the determination. Thus, in a case where, for example, the cause of the malfunction is unauthorized access by a suspicious person, a time at which the following unauthorized access can be performed can be delayed by a predetermined time. Therefore, the vehicle is less likely to be stolen.

[Overall Configuration of Electronic Key System]

Figure 1:
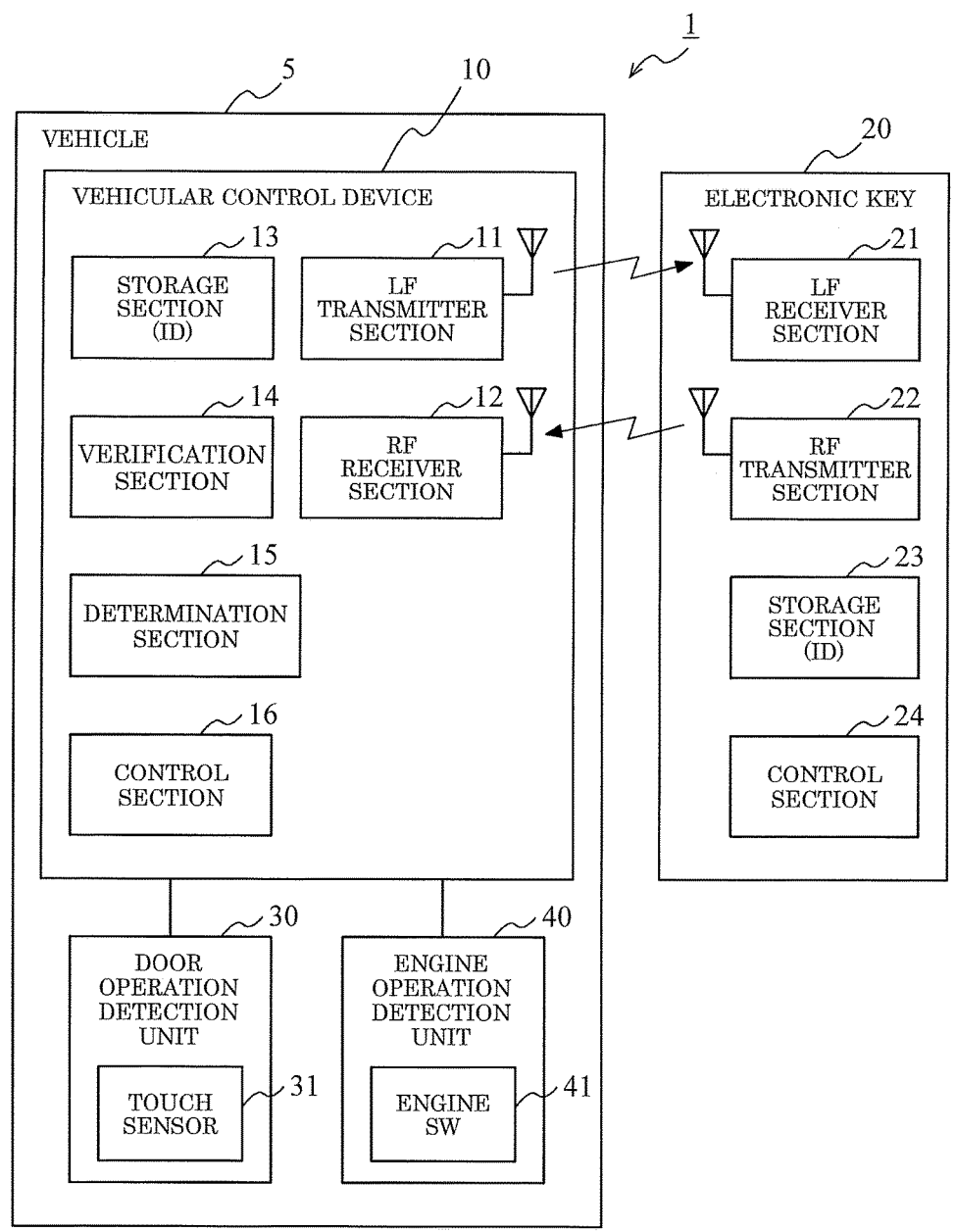
FIG. 1 is a schematic diagram illustrating the entirety of an electronic key system that is structured so as to include a vehicular control device according to one embodiment of the present invention.

FIG. 1 is a schematic diagram illustrating the entirety of an electronic key system 1 that is structured so as to include a vehicular control device 10 according to one embodiment of the present invention. In FIG. 1, the electronic key system 1 includes the vehicular control device 10 that is mounted to a vehicle 5, and an electronic key (may be referred to as a hand-held device) 20 that can be held and carried by a user or the like.

The vehicle 5 includes a door operation detection unit 30 capable of detecting an input operation onto a vehicle door, for example, a touching operation on a touch sensor 31 mounted to a door handle for, for example, requesting the vehicle door to be locked/unlocked (vehicle operation). Further, the vehicle 5 includes an engine operation detection unit 40 capable of detecting an input operation onto a vehicle engine, for example, an operation of pressing down an engine start and stop switch button (hereinafter, referred to as an "engine SW") 41 mounted to an instrument panel for, for example, requesting start-up of the engine (vehicle operation).

[Configuration of Vehicular Control Device]

In FIG. 1, the vehicular control device 10 includes an LF transmitter section 11, an RF receiver section 12, a storage section 13, a verification section 14, a determination section 15, and a control section 16.

When the control section 16 determines that the door operation detection unit 30, the engine operation detection unit 40, or the like has detected an input operation performed by a user or the like, the LF transmitter section 11 can transmit a request signal via a transmission antenna to locations within a predetermined range. The request signal is a signal for requesting an electronic key 20 near the vehicle 5 to transmit a response signal including identification information ID. The request signal is transmitted by, for example, LF (Low Frequency) communication. In the description herein, the predetermined range (hereinafter, referred to as a "detection area") is a range of locations which the request signal can reach, and, further, in which a response signal from the electronic key 20 can be detected. In the case of the LF communication, for example, the detection area is distant from the transmission antenna by about 0.7 to 1.0 m. The determination section 15 is notified of transmission information that indicates that the LF transmitter section 11 has transmitted the request signal.

The RF receiver section 12 can receive, via a reception antenna, a response signal transmitted by an RF transmitter section 22 of the electronic key 20 described below. The response signal includes at least identification information ID that is previously registered so as to be unique to the electronic key 20 that has transmitted the response signal. The RF receiver section 12 outputs, when receiving the response signal from the electronic key 20, the response signal to the verification section 14. The determination section 15 is notified of reception information that indicates that the RF receiver section 12 has received the response signal from the electronic key 20.

The storage section 13 is, for example, a memory, and previously stores data of at least one identification information ID for specifying an authorized electronic key 20 which allows vehicular control of the vehicle 5. Further, the storage section 13 previously stores information such as threshold values used for a predetermined verification described below.

The verification section 14 obtains a response signal from the RF receiver section 12. The verification section 14 performs a predetermined verification on the basis of the obtained response signal and information stored in the storage section 13. The predetermined verification is, for example, a process of comparing between the identification information ID included in the response signal and the identification information ID registered in the storage section 13, and determining whether or not the identification information ID included in the response signal coincides with the identification information ID registered in the storage section 13. Further, for example, the predetermined verification may include a process of comparing between a level (radio wave intensity) of the response signal and a threshold value stored in the storage section 13, and determining whether or not the level of the response signal exceeds the threshold value. Furthermore, for example, the predetermined verification may include a process of comparing between intervals at which a response signal is received, and a threshold value stored in the storage section 13, and determining whether or not the intervals at which the response signal is received exceeds the threshold value.

The verification section 14 can determine, by determining whether or not the identification information ID included in the response signal coincides with the identification information ID registered in the storage section 13, whether or not the electronic key 20 that has transmitted the response signal is an authorized electronic key In a case where both the identification information ID included in the response signal and the identification information ID registered in the storage section 13 coincide with each other, the electronic key 20 that has transmitted the response signal is determined as an authorized electronic key, and the verification succeeds. By the verification, an electronic key of another vehicle of the same type as the user's vehicle type is excluded. In addition thereto, even when the electronic key 20 is determined as an authorized electronic key, if a predetermined condition (for example, radio wave intensity) is not satisfied, the verification may be prevented from succeeding. The result of the verification is outputted to the determination section 15 from the verification section 14.

To the determination section 15, the transmission information of the request signal is inputted from the LF transmitter section 11, the reception information of the response signal is inputted from the RF receiver section 12, and the result of verification is inputted from the verification section 14. The determination section 15 performs determination process of determining whether or not the RF receiver section 12 receives the response signal until a predetermined time (hereinafter, referred to as "first time") passes since transmission of the request signal by the LF transmitter section 11, and, further, the verification has succeeded in the verification section 14.

Specifically, in a case where the response signal is received by the RF receiver section 12 until the first time passes since transmission of the request signal by the LF transmitter section 11, and it is determined that the received response signal has been transmitted from the authorized electronic key 20 and verification based on the response signal has succeeded in the verification section 14, the determination section 15 determines that communication between the vehicular control device 10 and the electronic key 20 is "normal". Meanwhile, in a case where the response signal is not received by the RF receiver section 12 until the first time passes since transmission of the request signal by the LF transmitter section 11, or in a case where, although the response signal has been received by the RF receiver section 12 until the first time passes, the verification based on the response signal has failed in the verification section 14, the determination section 15 determines that communication between the vehicular control device 10 and the electronic key 20 is "abnormal". The determination section 15 notifies the control section 16 of the result of the determination (normal/abnormal).

The control section 16 controls whether a vehicle operation according to an input operation from a user is allowed or prohibited, on the basis of the result of determination from the determination section 15. Specifically, when the determination section 15 determines "normal", the control section 16 allows the vehicle operation. Meanwhile, when the determination section 15 determines "abnormal", the control section 16 prohibits the vehicle operation until a predetermined time (hereinafter, referred to as "second time"). That is, an input operation by a user is temporarily disabled. The second time until which the vehicle operation is prohibited, may be determined on the basis of a reference table that is previously stored by the control section 16 or the like, or may be calculated by using a predetermined equation.

In order to perform control so as to prohibit the vehicle operation, a detection section of the door operation detection unit 30, the engine operation detection unit 40, or the like may be prevented from receiving an input operation from a user. Alternatively, in order to perform control so as to prohibit the vehicle operation, the LF transmitter section 11 may be prevented from transmitting a request signal. Still alternatively, in order to perform control so as to prohibit the vehicle operation, the verification section 14 may be prevented from performing verification. The control for preventing the engine operation detection unit 40 from receiving an input operation is not intended to prevent reception of an input operation, by transponder communication, which is a backup function in case of emergency.

FIG. 2A and FIG. 2B show exemplary cases where the second time until which the vehicle operation is prohibited as described above is determined by using reference tables. As shown in, for example, FIG. 2A and FIG. 2B, the second time is set such that the greater the number of times (corresponding to a counted value N described below) the determination section 15 determines "abnormal" is, the more greatly the second time is delayed.

The entirety or a part of the LF transmitter section 11, the RF receiver section 12, the storage section 13, the verification section 14, the determination section 15, and the control section 16, which are described above, may be typically configured as an electronic control unit (ECU) that includes a central processing unit (CPU), a memory, an input/output interface, and the like. The electronic control unit performs a predetermined function by a predetermined program stored in the memory being read, interpreted, and executed by the CPU.

[Configuration of Electronic Key]

In FIG. 1, the electronic key 20 includes an LF receiver section 21, an RF transmitter section 22, a storage section 23, and a control section 24.

The LF receiver section 21 can receive, via a reception antenna, a request signal transmitted by the LF transmitter section 11 of the vehicular control device 10. The control section 24 is notified of reception information that indicates that the LF receiver section 21 has received the request signal from the LF transmitter section 11.

The storage section 23 is, for example, a memory, and previously stores identification information ID allocated uniquely to the authorized electronic key 20 which is allowed to perform vehicle operation of the vehicle 5.

The control section 24 instructs, when receiving, from the LF receiver section 21, notification that the request signal has been received, the RF transmitter section 22 to transmit a response signal that includes the identification information ID stored in the storage section 23.

According to the instruction from the control section 24, the RF transmitter section 22 can generate the response signal that includes the identification information ID, and can transmit the response signal via a transmission antenna to a location within a predetermined range. The response signal is transmitted by, for example, RF (Radio Frequency) communication. In the description herein, the predetermined range represents a range of locations which the response signal can reach. The predetermined range is, for example, a range of locations that are distant from the transmission antenna by about 20 to 100 m in the case of the RF communication.

The entirety or a part of the LF receiver section 21, the RF transmitter section 22, the storage section 23, and the control section 24, which are described above, may be typically configured as an electronic control unit (ECU) that includes a central processing unit (CPU), a memory, an input/output interface, and the like. The electronic control unit performs a predetermined function by a program stored in the memory being read, interpreted, and executed by the CPU.

[Control by Vehicular Control Device]

Next, control performed by the vehicular control device 10 will be described by further referring to FIG. 3 and FIG. 4. In the vehicular control device 10 according to the present embodiment, when the determination section 15 determines "abnormal", the number of times the determination is "abnormal" is counted by the control section 16, and a time until which an input operation is temporarily disabled to prohibit vehicle operation, is controlled according to the counted value N.

First Specific Example

Figure 3:
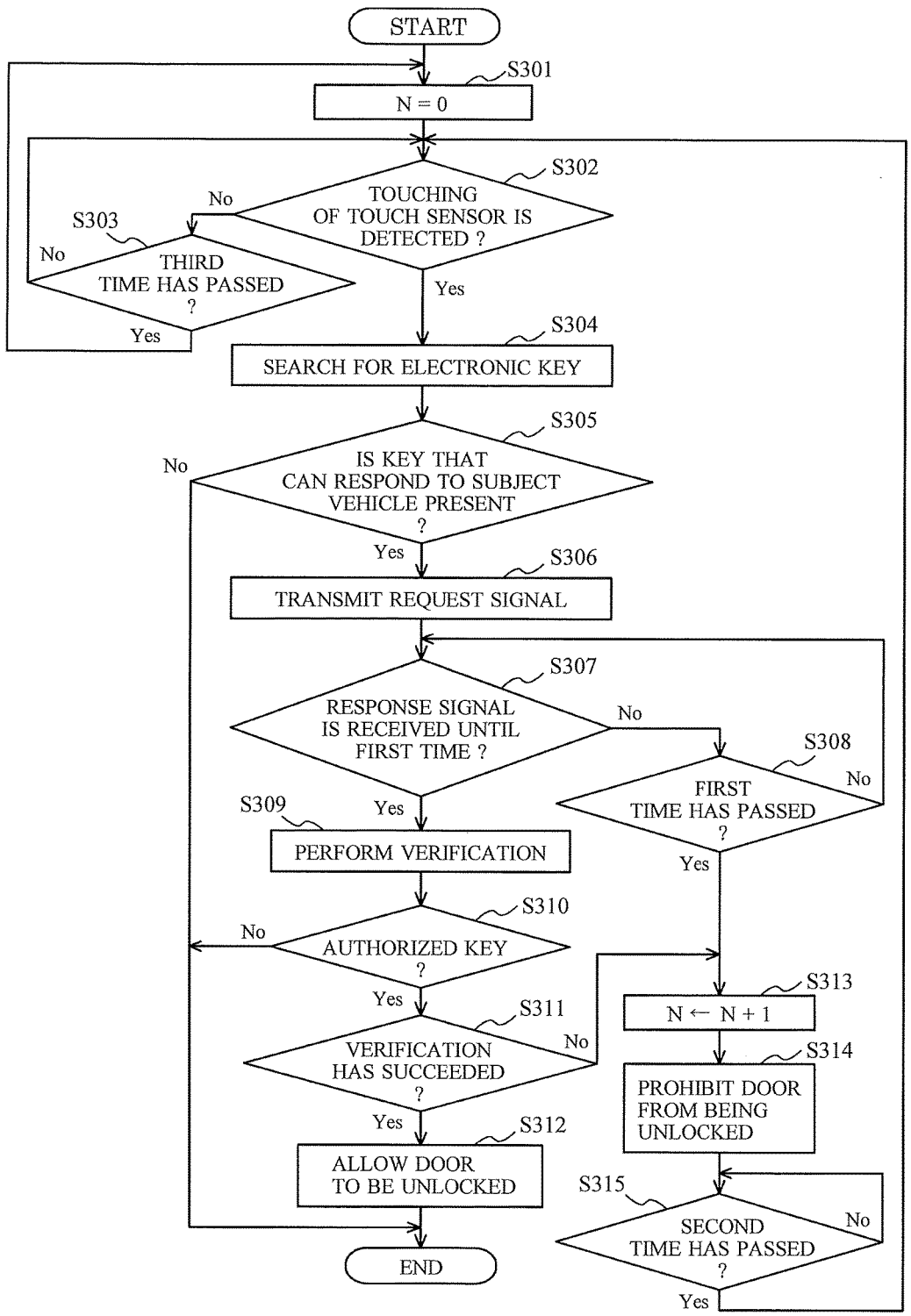
FIG. 3 is a flow chart showing process steps, of a first specific example, performed by the vehicular control device of the present invention.

FIG. 3 is a flow chart showing process steps, of a first specific example, performed by the vehicular control device 10 according to one embodiment of the present invention. In the first specific example shown in FIG. 3, a case where the vehicle 5 in which the vehicle door is locked, is instructed to unlock the door by an action of "touching the touch sensor 31 mounted at a door handle" being performed as a predetermined input operation, is assumed.

Firstly, the counted value N is reset and initialized (step S301). After the counted value N is reset and initialized, the control section 16 determines whether or not a predetermined detection section detects an input operation onto the vehicle (step S302). In the first specific example, for example, the control section 16 determines whether or not the door operation detection unit 30 detects that the touch sensor 31 mounted at the door handle has been touched.

When it is detected that the touch sensor 31 has been touched (Yes in step S302), the control section 16 searches a detection area outside the vehicle for the electronic key 20 that can respond to the vehicle 5 to be controlled ((hereinafter, referred to as "subject vehicle") (step S304). For this searching, a known technique can be used. The electronic key 20 that can respond to the subject vehicle includes, for example, an electronic key of another vehicle of the same type as that of the subject vehicle, as well as the authorized electronic key 20 of the subject vehicle.

When it is not detected that the touch sensor 31 is touched (No in step S302), whether or not a predetermined time (hereinafter, referred to as "third time") has passed is determined (step S303). When the third time has not passed (No in step S303), the process is returned to step S302, and whether or not touching of the touch sensor 31 has been detected is continuously determined. Meanwhile, when the third time has passed (Yes in step S303), it is determined that occurrence of an "abnormal" state until that time, has been overcome, and the counted value N is reset and initialized (step S301).

In a case where, as a result of the above-described searching, it is determined that the electronic key 20 that can respond to the subject vehicle is in the detection area outside the vehicle (Yes in step S305), the request signal is transmitted from the LF transmitter section 11 to the detection area outside the vehicle (step S306). Meanwhile, in a case where, as a result of the above-described searching, it is determined that the electronic key 20 that can respond to the subject vehicle is not in the detection area outside the vehicle (No in step S305), the process is ended since whether or not the door is to be unlocked need not be determined.

After the request signal has been transmitted in step S306, the determination section 15 subsequently determines whether or not communication with the electronic key 20 has been normally performed until passing of the first time. In the first specific example, in order to determine whether or not communication with the electronic key 20 has been normally performed, whether or not the RF receiver section 12 has received a response signal corresponding to a request signal, until the first time (until passing of the first time), is determined (step S307, S308), whether or not the response signal has been transmitted by the authorized electronic key 20 as a result of the predetermined verification for the received response signal having been performed by the verification section 14 (step S309), is determined (step S310), and whether or not the verification based on the response signal has succeeded is determined (step S311).

In a case where the verification has succeeded (Yes in step S311) since the response signal corresponding to the request signal has been received until the first time (Yes in step S307), and the received response signal has been transmitted from the authorized electronic key 20 (Yes in step S310), communication with the electronic key 20 is determined as "normal". In this case, the control section 16 allows the vehicle 5 to operate according to an input operation from a user. In the first specific example, an operation of unlocking the vehicle door by a not-illustrated door locking mechanism is allowed (step S312).

Meanwhile, in a case where the response signal corresponding to the request signal has not been received until the first time (No in step S307 and Yes in step S308), or the verification has not succeeded (No in step S311) although the received response signal has been transmitted by the authorized electronic key 20 (Yes in step S310), communication with the electronic key 20 is determined as "abnormal". In this case, the control section 16 performs control of prohibiting the vehicle 5 from operating according to an input operation from the user (that is, disabling the input operation) as follows.

Firstly, the counted value N indicating the number of times the determination section 15 has determined "abnormal" is updated by being incremented by one (step S313). When the counted value N has been updated, the control section 16 subsequently prohibits the vehicle operation according to the input operation (step S314). In the first specific example, for example, the vehicle door is prohibited from being unlocked according to touching of the touch sensor 31 (step S314). The vehicle operation according to the input operation is prohibited until the second time that is determined on the basis of the counted value N (step S315).

For example, in a case where the reference table shown in FIG. 2A is used, when the determination section 15 initially determines "abnormal", the vehicle operation is prohibited for only five seconds, and when the determination section 15 continuously determines "abnormal" five times, the vehicle operation is continuously prohibited as long as 10 minutes (600 seconds).

In the above verification, when it is determined that the received response signal is not transmitted from the authorized electronic key 20 (No in step S310), the process is ended since whether or not the door is to be unlocked need not be determined.

In a case where, after the second time has passed, the prohibition of the vehicle operation according to the input operation is canceled and the vehicle operation is allowed (Yes in step S315), the process is returned to step S302 and the process step of determining whether or not touching of the touch sensor 31 mounted at the door handle has been newly detected, and the following process steps are repeatedly performed. Therefore, vehicle operation according to an input operation that is newly detected by the detection section after the second time has passed, is allowed.

In the process of the first specific example as described above, occurrence of abnormality in communication and the number of times the abnormality in communication has occurred are determined, and the vehicle operation is prohibited for a time period based on the number of times the abnormality in communication has continuously occurred. Therefore, for example, continuous abnormality in communication which is estimated to occur in the case of unauthorized access using relaying of a signal, is determined, and a time at which the unauthorized access succeeds can be delayed. Thus, it can be expected that, for example, a person who performs the unauthorized access is caused to give up unlocking of the vehicle door, or a user or the like can find the unauthorized operation onto the vehicle door. Therefore, a vehicle is less likely to be stolen.

Further, in the process of the first specific example as descried above, if the number of times abnormality in communication occurs is small, a time for which the vehicle operation is prohibited is shortened. Therefore, in a case where a user normally performs an operation for unlocking the vehicle door without performing unauthorized access, if, for example, abnormality in communication accidentally occurs due to noise or the like and the door cannot be unlocked, the prohibition of vehicle operation is automatically cancelled in a short time. Thus, the user is allowed to perform an operation for unlocking the vehicle door again after waits for a while without performing a process for cancelling prohibition of the vehicle operation, whereby influence on operability for a user can be minimized. Therefore, user's bothersome process for cancelling prohibition of vehicle operation can be avoided The vehicle operation prohibited by the control section 16 is not limited to a vehicle operation (for example, operation for unlocking the vehicle door) based on an input operation detected by the detection section, and may be freely set to various vehicle operations (for example, operation for unlocking the vehicle door and operation for staring up an engine) concerning prevention of the vehicle from being stolen.

Second Specific Example

Figure 4:
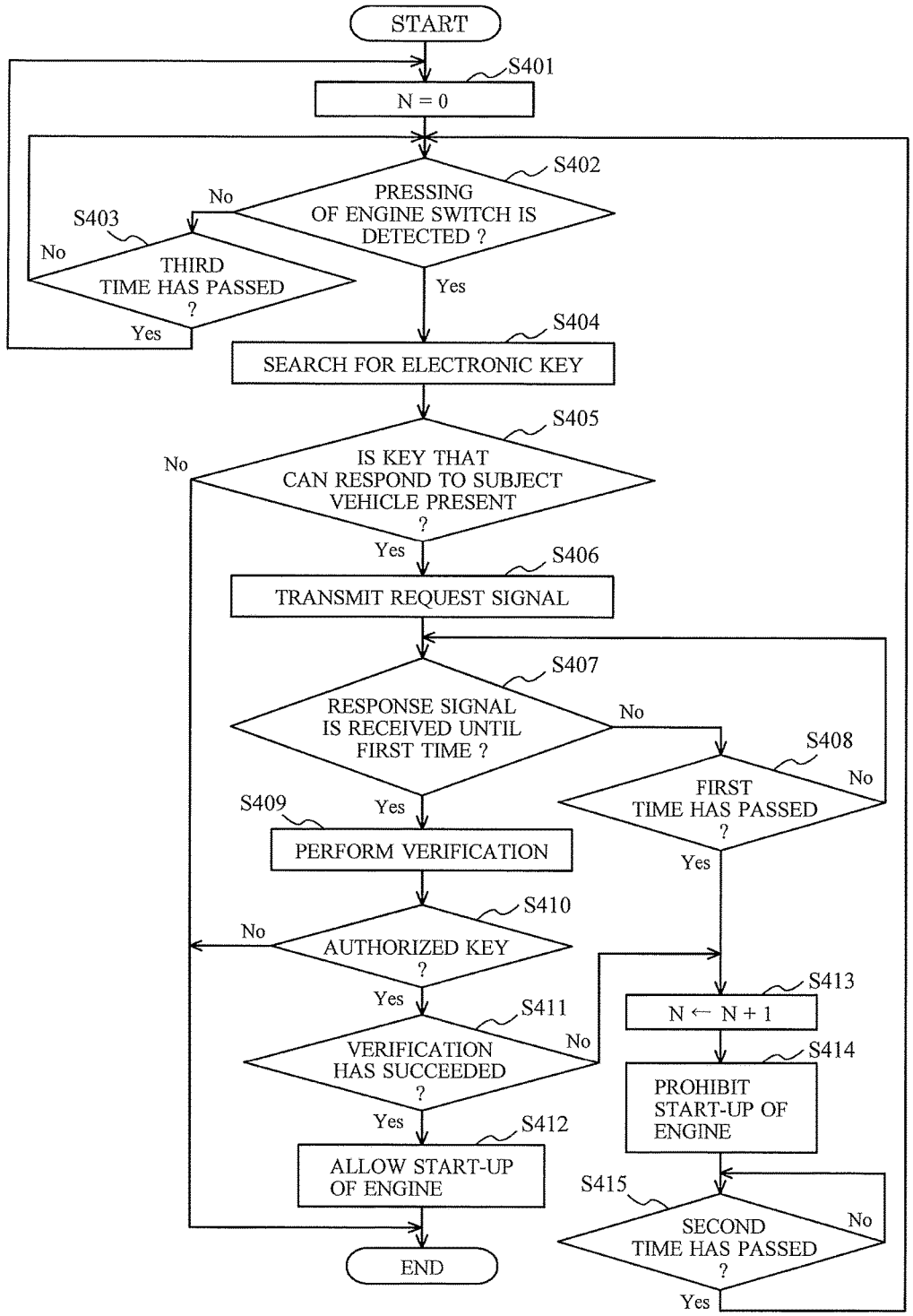
FIG. 4 is a flow chart showing process steps, of a second specific example, performed by the vehicular control device of the present invention.

FIG. 4 is a flow chart showing process steps, of a second specific example, performed by the vehicular control device 10 according to one embodiment of the present invention. In the second specific example shown in FIG. 4, a case where an instruction is made for staring up an engine by an action of "pressing down an engine SW 41" being performed as a predetermined input operation in a state where a person is in the vehicle 5, is assumed.

Firstly, the counted value N is reset and initialized (step S401). After the counted value N is reset and initialized, the control section 16 determines whether or not the predetermined detection section detects an input operation onto the vehicle (step S402). In the second specific example, for example, the control section 16 determines whether or not the engine operation detection unit 40 detects that the engine SW 41 mounted at the instrument panel has been pressed.

When it is detected that the engine SW 41 has been pressed (Yes in step S402), the control section 16 searches s detection area inside the vehicle for the electronic key 20 that can respond to the vehicle 5 to be controlled (subject vehicle) (step S404). For this searching, a known technique can be used. The electronic key 20 that can respond to the subject vehicle includes, for example, an electronic key of another vehicle of the same type as that of the subject vehicle, as well as the authorized electronic key 20 of the subject vehicle.

When it is not detected that the engine SW 41 is pressed (No in step S402), whether or not the third time has passed is determined (step S403). When the third time has not passed (No in step S403), the process is returned to step S402, and whether or not pressing of the engine SW 41 has been detected is continuously determined. Meanwhile, when the third time has passed (Yes in step S403), it is determined that occurrence of the "abnormal" state until that time, has been overcome, and the counted value N is reset and initialized (step S401).

In a case where, as a result of the above-described searching, it is determined that the electronic key 20 that can respond to the subject vehicle is in the detection area inside the vehicle (Yes in step S405), the request signal is transmitted from the LF transmitter section 11 to the detection area inside the vehicle (step S406). Meanwhile, in a case where, as a result of the above-described searching, it is determined that the electronic key 20 that can respond to the subject vehicle is not in the detection area inside the vehicle (No in step S405), the process is ended since whether or not the engine is to be started up need not be determined After the request signal has been transmitted in step S406, the determination section 15 subsequently determines whether or not communication with the electronic key 20 has been normally performed until passing of the first time.

In the second specific example, in order to determine whether or not communication with the electronic key 20 has been normally performed, whether or not the RF receiver section 12 has received a response signal corresponding to a request signal, until the first time (until passing of the first time), is determined (step S407, S408), whether or not the response signal has been transmitted by the authorized electronic key 20 as a result of the predetermined verification for the received response signal having been performed by the verification section 14 (step S409), is determined (step S410), and whether or not the verification based on the response signal has succeeded is determined (step S411).

In a case where the verification has succeeded (Yes in step S411) since the response signal corresponding to the request signal has been received until the first time (Yes in step S407), and the received response signal has been transmitted from the authorized electronic key 20 (Yes in step S410), communication with the electronic key 20 is determined as "normal". In this case, the control section 16 allows the vehicle 5 to operate according to an input operation from a user. In the second specific example, an operation of starting up the engine by a not-illustrated engine control mechanism is allowed (step S412).

Meanwhile, in a case where the response signal corresponding to the request signal has not been received until the first time (No in step S407 and Yes in step S408), or the verification has not succeeded (No in step S411) although the received response signal has been transmitted by the authorized electronic key 20 (Yes in step S410), communication with the electronic key 20 is determined as "abnormal". In this case, the control section 16 perform is control of prohibiting the vehicle 5 from operating according to an input operation from a user (that is, disabling the input operation) as follows Firstly, the counted value N indicating the number of times the determination section 15 has determined "abnormal" is updated by being incremented by one (step S413). When the counted value N has been updated, the control section 16 subsequently prohibits the vehicle operation according to the input operation (step S414). In the second specific example, for example, the engine is prohibited from being started up according to the engine SW 41 being pressed (step S414). The vehicle operation according to the input operation is prohibited until the second time that is determined on the basis of the counted value N (step S415).

For example, in a case where the reference table shown in FIG. 2A is used, when the determination section 15 initially determines "abnormal", the vehicle operation is prohibited for only five seconds, and when the determination section 15 continuously determines "abnormal" five times, the vehicle operation is continuously prohibited as long as 10 minutes (600 seconds).

In the above verification, when it is determined that the received response signal is not transmitted from the authorized electronic key 20 (No in step S410), the process is ended since whether or not the engine is to be started up need not be determined In a case where, after the second time has passed, the prohibition of the vehicle operation according to the input operation is canceled and the vehicle operation is allowed (Yes in step S415), the process is returned to step S402 and the process step of determining whether or not pressing of the engine SW 41 mounted at the instrument panel has been newly detected, and the following process steps are repeatedly performed. Therefore, the vehicle operation according to an input operation that is newly detected by the detection section after the second time has passed, is allowed.

In the process of the second specific example as described above, occurrence of abnormality in communication and the number of times the abnormality in communication has occurred are determined, and the vehicle operation is prohibited for a time period based on the number of times abnormality in communication has continuously occurred. Therefore, for example, continuous abnormality in communication which is estimated to occur in the case of unauthorized access using relaying of a signal, is determined, and a time at which the unauthorized access succeeds can be delayed. Thus, it can be expected that, for example, a person who performs the unauthorized access is caused to give up start-up of the engine of the vehicle, or a user or the like can find the unauthorized operation for starting up the engine. Therefore, a vehicle is less likely to be stolen.

Further, in the process of the second specific example as descried above, if the number of times abnormality in communication occurs is small, a time for which the vehicle operation is prohibited is shortened. Therefore, in a case where a user normally performs an operation for starting up the engine of the vehicle without performing unauthorized access, if, for example, abnormality in communication accidentally occurs due to noise or the like and the engine cannot be started up, the prohibition of vehicle operation is automatically cancelled in a short time. Thus, a user is allowed to perform an operation for starting up the engine of the vehicle again after waits for a while without performing a process for cancelling prohibition of the vehicle operation, whereby influence on operability for a user can be minimized. Therefore, user's bothersome process for cancelling prohibition of vehicle operation can be avoided.

The vehicle operation prohibited by the control section 16 is not limited to a vehicle operation (for example, operation for starting up the engine) based on an input operation detected by the detection section, and may be freely set to various vehicle operations (for example, operation for starting up the engine and operation for unlocking the vehicle door) concerning prevention of the vehicle from being stolen.

Action and Effect of the Present Embodiment

In the vehicular control device 10 according to one embodiment of the present invention as described above, the determination section 15 determines "abnormal" state that occurs in communication with the electronic key 20, such as an abnormal state in which the RF receiver section 12 cannot receive, until the first time, the response signal in response to a request signal transmitted by the LF transmitter section 11 according to an input operation onto the vehicle being detected, or an abnormal state in which, although the response signal can be received until the first time, the verification section 14 fails in verification of the electronic key 20. In a case where the determination section 15 determines "abnormal", the control section 16 prohibits vehicle operation according to an input operation until the second time passes since the point of time of the determination (new input operation is not received).

By this control, in a case where, for example, unauthorized access to the vehicle 5 is performed, and abnormality in communication with the electronic key 20 occurs, a time at which the following unauthorized access can be performed can be delayed until the second time. Therefore, the vehicle is less likely to be stolen.

Further, in the vehicular control device 10 of the present embodiment, a time period for which the control section 16 prohibits, on the basis of the determination section 15 having determined "abnormal", vehicle operation according to an input operation, is until passing of the second time. Thus, for example, even if a normal operation on the vehicle by a user is accidentally determined, due to noise or the like, as abnormality in communication, when the second time has passed, the prohibition of vehicle operation is cancelled, and the vehicle operation is automatically allowed (restored to the previous state). Therefore, user's bothersome process for cancelling prohibition of vehicle operation can be avoided.

Further, in the vehicular control device 10 according to the present embodiment, when the determination section 15 determines whether or not an "abnormal" state has occurred, not only whether or not the RF receiver section 12 can receive the response signal until the first time, but also whether the verification section 14 succeeds or fails in verification of the electronic key 20 based on the response signal received by the RF receiver section 12 until the first time, are determined. Thus, even if, for example, a suspicious person who has firstly used relaying of a signal for the unauthorized access gives up the use of relaying of a signal and changes the use of relaying of a signal to hacking which is directly performed on the vehicle device, an abnormal state that has occurred in communication with the electronic key 20 can be determined. Therefore, the vehicle is less likely to be stolen.

Further, in the vehicular control device 10 of the present embodiment, in a case where the determination section 15 continuously determines "abnormal", the control section 16 counts the number of times "abnormal" is determined. The control section 16 performs control such that the greater the number of times (counted value N) the determination section 15 continuously determines "abnormal" is, the more greatly the second time until which the vehicle operation according to the input operation is prohibited is delayed. Therefore, for example, for unauthorized access in which abnormality in communication is repeated, a time at which the unauthorized access succeeds can be delayed. In particular, for unauthorized access in which abnormality in communication is repeated multiple times, as the number of times failure continuously occurs becomes greater, a time at which the unauthorized access succeeds can be further delayed. Thus, an effect of causing a suspicious person to give up the unauthorized access can be expected, and the vehicle may be effectively inhibited from being stolen.

While the invention has been described in detail, the foregoing description is in all aspects illustrative and not restrictive. It will be understood that numerous other modifications and variations can be devised without departing from the scope of the invention.

What is claimed is:

1. A vehicular control device that is mounted to a vehicle, and that controls a vehicle operation according to an input operation from a user, on the basis of a result of verification of an electronic key through wireless communication, the vehicular control device comprising:
    a transmitter section configured to transmit a request signal to the electronic key when a predetermined detection section detects the input operation;
    a receiver section configured to receive, from the electronic key, a response signal in response to the request signal;
    a verification section configured to perform verification of the electronic key on the basis of the response signal;
    a determination section configured to determine that an abnormal state occurs, when the receiver section cannot receive the response signal until a first time or when the receiver section receives the response signal until the first time and the verification section fails in verification based on the received response signal, after the transmitter section has transmitted the request signal; and
    a control section configured to control a vehicle operation on the basis of a result of determination by the determination section, wherein
    when the determination section determines that an abnormal state occurs, the control section prohibits a vehicle operation according to the input operation detected by the detection section, until a second time passes after the determination section has determined that the abnormal state occurs, and, after the second time has passed, the control section allows a vehicle operation according to the input operation that is newly detected by the detection section.

2. The vehicular control device according to claim 1, wherein the control section counts the number of times the determination section determines that an abnormal state occurs, and sets the second time such that the greater a counted value of the number of times is, the more greatly the second time is delayed.

* * * * *